(12) United States Patent
Fresko

(10) Patent No.: US 7,343,603 B1
(45) Date of Patent: *Mar. 11, 2008

(54) SYSTEM AND METHOD FOR PERFORMING INCREMENTAL INITIALIZATION OF A MASTER RUNTIME SYSTEM PROCESS

(75) Inventor: Nedim Fresko, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 654 days.

This patent is subject to a terminal disclaimer.

(21) Appl. No.: 10/745,164

(22) Filed: Dec. 22, 2003

(51) Int. Cl.
*G06F 3/00* (2006.01)
*G06F 9/455* (2006.01)

(52) U.S. Cl. .......................... 719/310; 711/1
(58) Field of Classification Search ................ 719/310; 713/1; 711/1
See application file for complete search history.

(56) References Cited

U.S. PATENT DOCUMENTS 6,785,765 B1 * 8/2004 Roohparvar ................ 711/103
6,823,509 B2 * 11/2004 Webb ............................ 718/1
2003/0088604 A1 * 5/2003 Kuck et al. .................... 709/1

\* cited by examiner

*Primary Examiner*—William Thomson
*Assistant Examiner*—LeChi Truong
(74) *Attorney, Agent, or Firm*—Park Vaughan & Fleming LLP

(57) ABSTRACT

A system and method for performing incremental initialization of a master runtime system process is presented. A set of one or more warmup actions is defined from a source definition provided as object-oriented program code. A master runtime system process is executed. Each warmup action is executed to refine a memory space of the master runtime system process. The memory space is cloned as a child runtime system process responsive to a process request and the child runtime system process is executed. Initialization is incremental, such that the warmup actions are interleaved with potential requests for cloning child runtime system processes. The interleaving allows a user to interact with the master runtime system process before the full set of warmup actions are completed by the master runtime system process.

29 Claims, 10 Drawing Sheets

SYSTEM AND METHOD FOR PERFORMING INCREMENTAL INITIALIZATION OF A MASTER RUNTIME SYSTEM PROCESS

FIELD OF THE INVENTION

The invention relates in general to incremental initialization and, in particular, to a system and method for performing incremental initialization of a master runtime system process.

BACKGROUND OF THE INVENTION

Recent advances in microprocessor design and component integration have enabled a wide range of devices to offer increasingly complex functionality and "soft" features. Soft features include software applications that enhance and customize the operation of a device. These devices include standard computing devices, such as desktop and laptop computers, portable computing devices, such as personal data assistants, and consumer devices, such as cellular telephones, messaging pagers, gaming consoles, and set top boxes. Most devices now include an operating system to support the soft features and other extensions.

The increased capabilities offered by these software-upgradeable devices have also created certain user expectations. Often, users are not technically savvy and are intolerant of performance compromises occasioned by architectural challenges, such as slow or inconsistent application performance. Similarly, users generally expect to be able to access a host of separate applications, which are implemented at the system level through multitasking. For users, widely available software applications assure a positive experience through consistency and increased exposure across multiple platforms. However, for software developers, engineering software applications for disparate computing platforms entails increased development costs and on-going support and upgrade commitments for each supported architecture.

Managed code platforms provide one solution to software developers seeking to support multiple platforms by presenting a machine-independent and architecture-neutral operating environment. Managed code platforms include programming language compilers and interpreters executed by an operating system as user applications, but which provide virtual runtime environments within which compatible applications can operate. For instance, applications written in the Java programming language, when combined with a Java virtual machine (JVM) runtime environment, can operate on heterogeneous computer systems independent of machine-specific environment and configuration settings. An overview of the Java programming language is described in P. van der Linden, "Just Java," Ch. 1, Sun Microsystems, Inc. (2d ed. 1997), the disclosure of which is incorporated by reference. JVMs are a critical component to the overall Java operating environment, which can be ported to the full range of computational devices, including memory-constrained consumer devices.

Managed code platforms are generally designed for the monotonic execution of a single application instance. Multiple instances of a managed code platform are executed to simulate multitasking behavior. Such forced concurrency, however, creates several performance problems. First, each instance incurs a startup transient. Executable and startup data must be read from slow persistent storage, which results in slow initial application performance. Similarly, memory is not shared between instances and each additional instance increases the overall memory footprint of the platform by separately loading and instantiating classes, generally problematic in memory-constrained systems. Moreover, data dependencies and deferred initialization of system state can result in non-deterministic execution patterns. Finally, each instance independently determines the relative importance of executing methods and compiles machine code on an ad hoc basis, often causing inconsistent application performance.

One solution to providing concurrently executable managed code platforms involves designating a managed code platform that executes as a master process. Individual child managed code platform processes are spawned from the master process using process cloning and inherit runtime state from the master managed code platform. As a result, each child process benefits from the initialization actions completed by the master process. However, the initialization actions are performed as an all-or-nothing scheme that shifts the startup time and processing overhead to the master process in exchange for fast child process boot times. This technique can be problematic for resource constrained devices, where boot startup time is critical and a combination of slower processor and persistent storage and modest memory can cause significant boot times.

Therefore, there is a need for an approach to providing incremental initialization to a concurrent managed code platform, such as the Java operating environment, to balance initialization costs over time. Preferably, such an approach would support definable lists of initialization actions and tuning to achieve performance balance based on available resources.

SUMMARY OF THE INVENTION

A managed code platform is executed in an application framework that supports the spawning of multiple and independent isolated user applications. Preferably, the application framework supports the cloning of the memory space of each user application using copy-on-write semantics. The managed code platform includes a master runtime system process, such as a virtual machine, to interpret machine-portable code defining compatible applications. An application manager also executes within the application framework and is communicatively interfaced to the master runtime system process through an inter-process communication mechanism. The application framework logically copies the master runtime system process context upon request by the application framework to create a child runtime system process through process cloning. The context of the master runtime system process stored in memory is inherited by the child runtime system process as pre-warmed state and cached code. When implemented with copy-on-write semantics, the process cloning creates a logical copy of references to the master runtime system process context. Segments of the referenced master runtime system process context are lazily copied only upon an attempt by the child runtime system process to modify the referenced context. The application manager also manages a warmup list of definable actions, which are incrementally executed as warmup action increments by the master runtime system process. The warmup action increment executions might be interleaved with requests to start new applications before the entire set of actions in the warmup list are completed. The warmup action increments are executed by the master runtime system process in response to source commands. After each warmup action increment, the master runtime system process immediately returns to an inactive state to wait for additional commands. Any effects on the master runtime system process context resulting from the execution of a warmup action increment will refine or "enrich" the prewarmed state, such that subsequently cloned child runtime system processes spawned will inherit the refined context. Incremental initialization balances the startup time and processing overhead of the master runtime system process against the startup times and processing overheads of the child runtime system processes. An example of a suitable managed code platform and runtime system process are the Java operating environment and Java virtual machine (JVM) architecture, as licensed by Sun Microsystems, Inc., Palo Alto, Calif.

One embodiment provides a system and method for performing incremental initialization of a master runtime system process. A set of one or more warmup actions is defined from a source definition provided as object-oriented program code. A master runtime system process is executed. Each warmup action is executed to refine a memory space of the master runtime system process. The memory space is cloned as a child runtime system process responsive to a process request and the child runtime system process is executed. Initialization is incremental, such that the warmup actions are interleaved with potential requests for cloning child runtime system processes. The interleaving allows a user to interact with the master runtime system process before the full set of warmup actions are completed by the master runtime system process.

The use of the process cloning mechanism provided by the underlying application framework provides several benefits in addition to resolving the need for efficient concurrent application execution of machine portable code. The inheritance of prewarmed state through the cloning of the master runtime process context provides inter-process sharing of incrementally initialized state, including preloaded classes and classes defined in libraries, precompiled methods, code caches, statically initialized methods, and any state change reflected in the memory space of the master runtime process. Similarly, each child runtime system process executes in isolation of each other process, thereby providing strong resource control through the system level services of the application framework. Isolation, reliable process invocation and termination, and resource reclamation are available and cleanly provided at an operating system level. In addition, process cloning provides fast user application initialization and deterministic runtime behavior, particularly for environments providing process cloning with copy-on-write semantics. Finally, for non-shareable segments of the master runtime system process context, actual copying is deferred until required through copy-on-write semantics, which avoids impacting application performance until, and if, the segment is required.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

BRIEF DESCRIPTION OF THE DRAWINGS

FIG. 3 is a block diagram showing, by way of example, a master JVM process mapped into a page table.

DETAILED DESCRIPTION

System Overview

Figure 1:
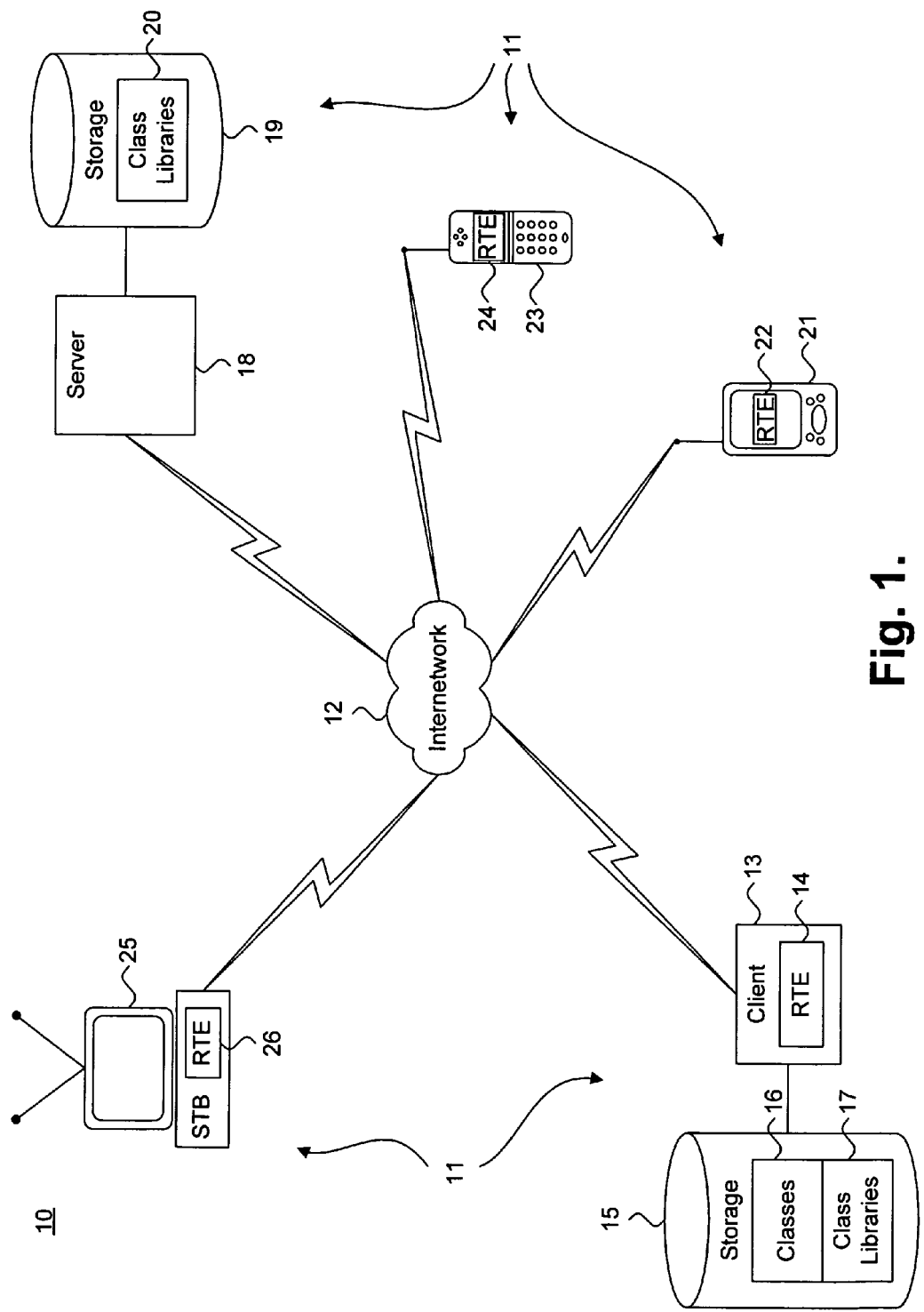
FIG. 1 is a functional block diagram showing, by way of example, runtime environments implemented on a plurality of heterogeneous devices.

FIG. 1 is a functional block diagram 10 showing, by way of example, runtime environments (RTEs) 14, 22, 24, 26 implemented on a plurality of heterogeneous devices 11. Each heterogeneous device 11 provides a managed code platform, such as the Java operating environment, executing in a runtime environment 14, 21, 24, 26, as further described below with reference to FIG. 2. The heterogeneous devices 11 include, nonexclusively, a client computer system 13, such as a desktop or laptop computer system. Each client 13 is operatively coupled to a storage device 15 and maintains a set of classes 16 and class libraries 17, which respectively define code modules that specify data structures and sets of methods that operate on the data, and shareable collections of the modules. The heterogeneous devices 11 also include portable computing devices, including personal data assistants 21, and consumer devices, such as cellular telephones 23 and set top boxes (STB) 25. Finally, a server 18 is operatively coupled to a storage device 19 in which globally shareable class libraries 20 are maintained. Each of the heterogeneous devices 11 can interface via a network 12, which includes conventional hardwired and wireless network configurations. Other types of heterogeneous devices 11 and various network configurations, arrangements, and topologies are possible.

Each heterogeneous device 11 includes an operating system to manage resources, provide access to peripheral devices, allocate memory resources, and control program execution and termination. Each operating system supports a process cloning mechanism that spawns multiple and independent isolated user applications by cloning the memory space of specifiable processes. An example of a process cloning mechanism suitable for use in the present invention is the fork( ) system call provided by the Unix or Linux operating systems, such as described in M. J. Bach, "The Design Of The Unix Operating System," Ch. 7, Bell Tele. Labs., Inc. (1986), the disclosure of which is incorporated by reference. The process invoking the fork( ) system call is known as the parent process and the newly created process is called the child process. The operating system assigns a separate process identifier to the child process, which executes as a separate process. The operating system also creates a logical copy of the context of the parent process by copying the memory space of the parent process into the memory space of the child process. In a copy-on-write variant of the fork( ) system call, the operating system only copies references to the memory space and defers actually copying individual memory space segments until, and if, the child process attempts to modify the referenced data of the parent process context. The copy-on-write fork( ) system call is faster than the non-copy-on-write fork( ) system call and implicitly shares any data not written into between the parent and child processes.

System for Performing Incremental Initialization

Figure 2:
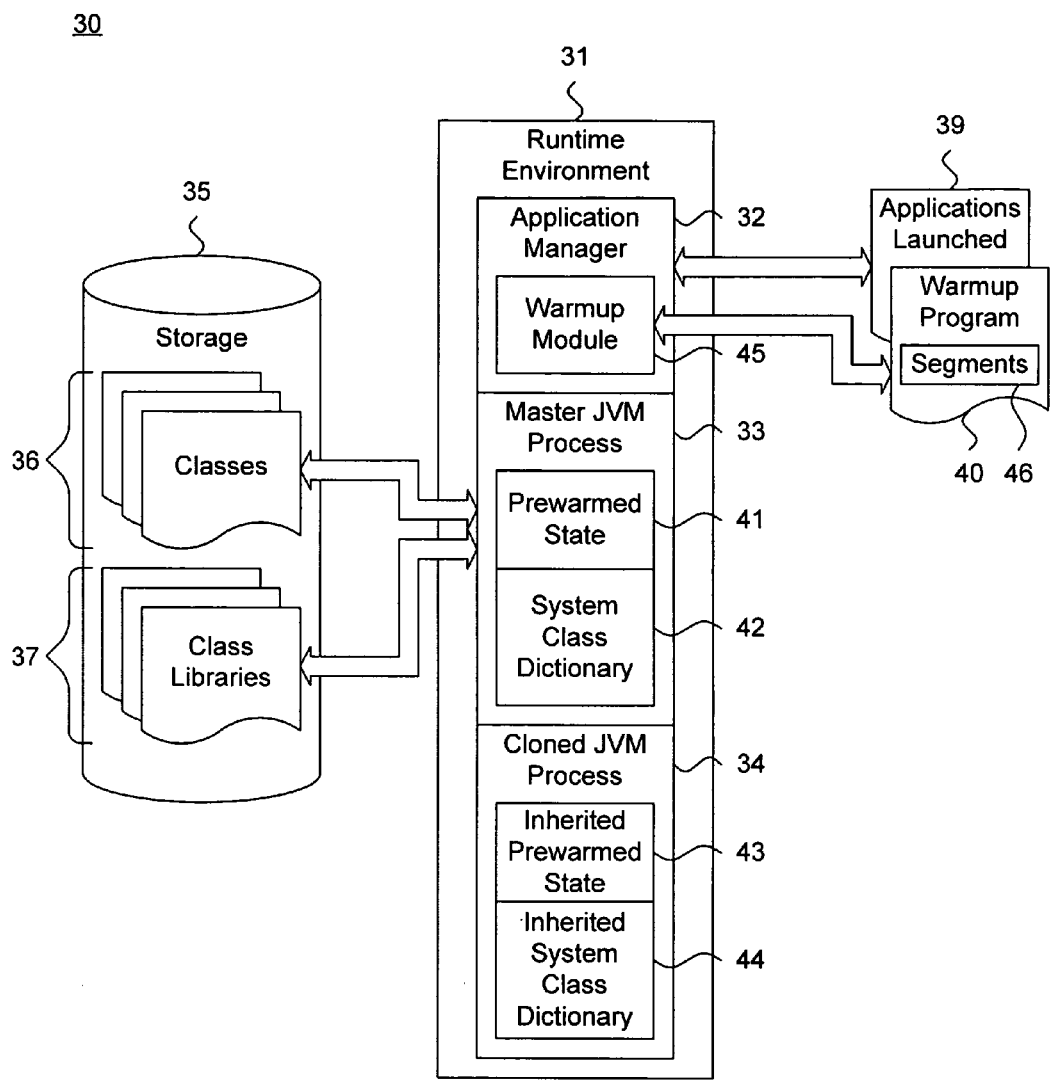
FIG. 2 is a block diagram showing a system for performing incremental initialization of a master runtime system process, in accordance with the invention.

FIG. 2 is a block diagram 30 showing a system for performing incremental initialization of a master runtime system process 33, in accordance with the invention. The system consists of a runtime environment 31 and individual classes 36 and class libraries 37 that form the overall core managed code platform. Note that in one embodiment of the present invention storage 35 stores classes 36 and class libraries 37. By way of example, the system is described with reference to the Java operating environment, although other forms of managed code platforms that execute applications preferably written in an object oriented programming language, such as the Java programming language, could also be used.

The exemplary runtime environment 31 includes an application manager 32, master Java virtual machine (JVM) process 33 and zero or more cloned JVM processes 34. The master JVM process 33 and cloned JVM processes 34 respectively correspond to a master runtime system process and child runtime system processes. The master runtime system process, preferably provided as a virtual machine, interprets machine-portable code defining compatible applications.

The runtime environment 31 executes an application framework that spawns multiple independent and isolated user application process instances by preferably cloning the memory space of a master runtime system process. The example of an application framework suitable for use in the present invention is the Unix operating system, such as described generally in M. J. Bach, supra at Ch. 2, the disclosure of which is incorporated by reference.

The application manager 32 presents a user interface through which individual applications can be selected and executed. The application manager 32 and master JVM process 33 preferably communicate via an inter-process communication (IPC) mechanism, such as a pipe or a socket. The master JVM process 33 is started at device boot time, with minimal or no initialization and warmup actions. The application manager 32 then starts up and incrementally initializes the master JVM process 33, as further described below with reference to FIG. 10.

Following the minimal initialization, the master JVM process 33 idles, that is, "sleeps" in an inactive state, while awaiting further instructions from the application manager 32. The master JVM process 33 awakens in response to requests received from the application manager 32 to execute applications and to execute incremental warmup actions that warmup the master JVM process memory state. The application manager 32 sends either a warmup request or an application launch request to the master JVM process 33, including standard command line parameters, such as application name, class path, and application arguments. On a warmup request, the master JVM process 33 awakens and executes an incremental warmup action, thereby enriching the memory state of the master JVM process 33 to benefit further application launch "clone" requests. On an application launch request, the master JVM process 33 awakens and creates a cloned JVM process 34 as a new cloned process instance of the master JVM process 33 using the process cloning mechanism of the underlying operating system. The context of the master JVM process 33 stored in memory as prewarmed state 41 and system class dictionary 42 is inherited by the cloned JVM process 34 as inherited prewarmed state 43 and inherited system class dictionary 44, thereby saving initialization and runtime execution times and providing deterministic execution behavior. Following the "cloning" of the cloned JVM process 34, the master JVM process 33 records the launched application in an applications launched list 39 and returns to an inactive sleep state.

When implemented with copy-on-write semantics, the process cloning creates a logical copy of only the references to the master JVM process context. Segments of the referenced master JVM process context are lazily copied only upon an attempt by the cloned JVM process to modify the referenced context. Therefore, as long as the cloned JVM process does not write into a memory segment, the segment remains shared between parent and child processes.

The master JVM process 33 recognizes the following basic commands received from the application manager 32 through the IPC mechanism:

(1) list: Provides a list of applications launched in response to requests received from the application manager 32.

(2) jexec: Invokes the process cloning mechanism, parses command line arguments and executes a new instance of the master JVM process 33 as the cloned JVM process 34. Preferably adopts a syntax compatible to standard JVM processes.

(3) kill: Terminates the application identified by an application handle or process identifier.

(4) source: Parses arguments and executes a program in the body of the master JVM process 33 without creating a cloned JVM process 34. Subsequently cloned JVM processes 34 inherit the refined memory state of the master JVM process 33 resulting from the execution of a source command on behalf of the master JVM process 33.

Other commands are possible.

The source command can be sent to the master JVM process 33 to perform warmup actions, such as class loading, initialization, dynamic compilation, and so forth. In contrast, the jexec command spawns a cloned JVM process 34 creating a new instance of the master JVM process 33 and inherits the then-warmed up context, including the prewarmed state 41 and system class dictionary 42 of the master JVM process 33. The jexec command can be used to execute programs written, for instance, in the Java programming language. The source command can also be used to execute programs, without cloning, within the context of the master JVM process 33.

At runtime, after the master JVM process 33 executes a program in response to a source command, the master JVM process 33 immediately returns to an inactive state to wait additional commands. Any effects on the master JVM process context resulting from the execution of a program using the source command refine or "enrich" the prewarmed state 41 of the master JVM process 33, such that subsequently cloned JVM processes 34 spawned from the master JVM process 33 will inherit the refined context, as further described below with reference to FIGS. 5A-B.

The cumulative effect of executing a source command on the master JVM process 33 allows the warmup state, that is, the prewarmed state 41 and system class dictionary 42, to be incrementally initialized. The application manager 32 loads a warmup program 40 and a warmup module 45 divides the warmup program 40 into segments 46 that can each be executed as a program invocation. The application manager 32 then sends each segment 46 to the master JVM process 33 using the source command, one after the other in sequence without waiting, after each segment, checking for any pending commands. The master JVM process 33 executes each segment 46 to incrementally warmup the context, including the prewarmed state 41 and system class dictionary 42. Each subsequently spawned cloned JVM process 33 inherits the then-warmed up context as inherited prewarmed state 43 and inherited system class dictionary 44 based on the segments 46 executed by the master JVM process 33 up to that time. Various warmup actions are possible, including, for example, dynamically preloading classes, eliminating static initialization overhead, performing speculative initialization of application models, providing precompiled code, learning with dynamic feedback, and inducing behavior changes, such as described in commonly-assigned U.S. patent applications Ser. No. 10/745,023, entitled "System And Method For Dynamic Preloading Of Classes Through Memory Space Cloning Of A Master Runtime System Process," filed 22 Dec. 2003, pending; Ser. No. 10/745,022, entitled "System And Method For Performing Speculative Initialization Of Application Models For A Cloned Runtime System Process," filed 22 Dec. 2003, pending; and Ser. No. 10/745,020, entitled "System And Method For Providing Precompiled Code Through Memory Space Cloning Of A Master Runtime System Process," filed 22 Dec. 2003, pending; and issued U.S. Pat. No. 7,124,291, entitled "System And Method For Eliminating Static Initialization Overhead By Memory Space Cloning Of A Master Runtime System Process," filed 22 Dec. 2003; the disclosures of which are incorporated by reference.

The warmup program 40 can be specified in different formats. In one embodiment, the warmup program 40 accepts a list of arguments and the application manager 32 uses the same warmup program with a different list of arguments for each segment. In a further embodiment, the warmup actions are divided into individual stand alone programs and the application manager 32 uses a different warmup program for each segment.

Individual invocations of the source and jexec commands can be interleaved without any timed waits to enable a user to immediately interact with the system. For instance, the application manager 32 will send a jexec command to the master JVM process 33 in response to a user requesting an application launch, such as by tapping on an icon representing an application program. If the application manager 32 is in the process of issuing a source command to the master JVM process 33, the application manager 32 can send the jexec command to an event handler for the icon tap (not shown). The event handler generally executes as a separate thread of execution from the main execution thread of the application manager 32, which is busy issuing the source command. Alternatively, the application manager 32 can temporarily queue the jexec command in a data structure to allow the application manager 32 to wait until the completion of the source command issuance before sending the jexec command to the master JVM process 33. Similarly, the master JVM process 33 can also rely on the IPC mechanism provided by the underlying operating system to enqueue the jexec command if the master JVM process 33 is busy processing the source command. The master JVM process 33 will then receive the jexec command upon resuming a listening state.

By carefully tuning segment length and count using the application manager 32, the system can trade off boot time against user interactivity. The warmup actions specified in the warmup program 40 can be performed at any time beginning with the booting of the master JVM process 33. The cloned JVM processes 34 can also be spawned at any time, including prior to the execution of any of the segments 46 of the warmup program 40. However, any resulting cloned JVM process 34 would only inherit the prewarmed state 41 and system class dictionary 42 representing the context of the master JVM process 33 up to that time. The only effect on each cloned JVM process 34 would be not inheriting the maximum possible prewarmed state from the master JVM process 33. If all of the segments 46 of the warmup program 40 could be executed by the master JVM process 33 prior to the execution of the first cloned JVM process 34. Maximum inherited prewarmed state would be ensured.

Master JVM Process Mapping

Figure 3:
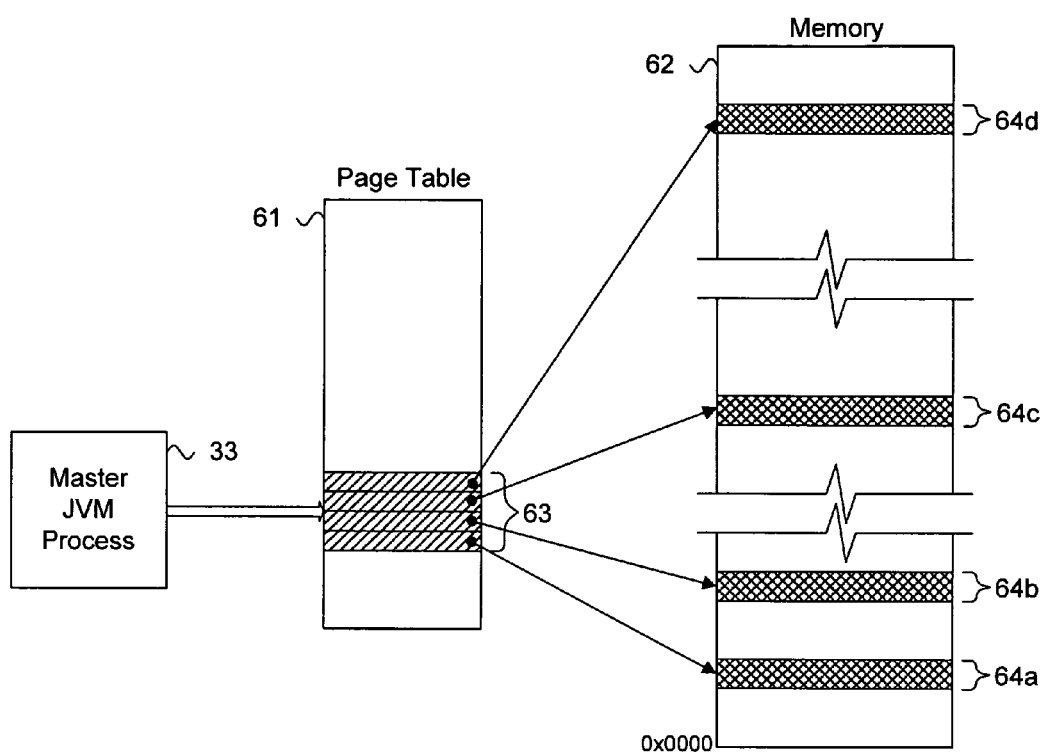
FIG. 3 is a block diagram showing, by way of example, the effect of further initializing the prewarmed state of a master JVM process.

FIG. 3 is a block diagram 60 showing, by way of example, a master JVM process 33 mapped into memory 62. Generally, the context for an executing process includes a data space, user stack, kernel stack, and a user area that lists open files, current directory and supervisory permission settings. Other types of context can also be provided. The context is stored and managed in the memory 62 by the operating system. At device boot time, the operating system instantiates a representation of the executable master JVM process 33 into the memory 62, possibly in non-contiguous pages 64a-d, and records the allocation of the memory space as page table entries 63 into the page table 61 prior to commencing execution of the master JVM process 33. As well, the master JVM process context could similarly be mapped using other memory management systems, such as using demand paging, swapping and similar process memory allocation schemes compatible with process cloning, particularly process cloning with copy-on-write semantics.

Cloned JVM Process Mapping

Figure 4:
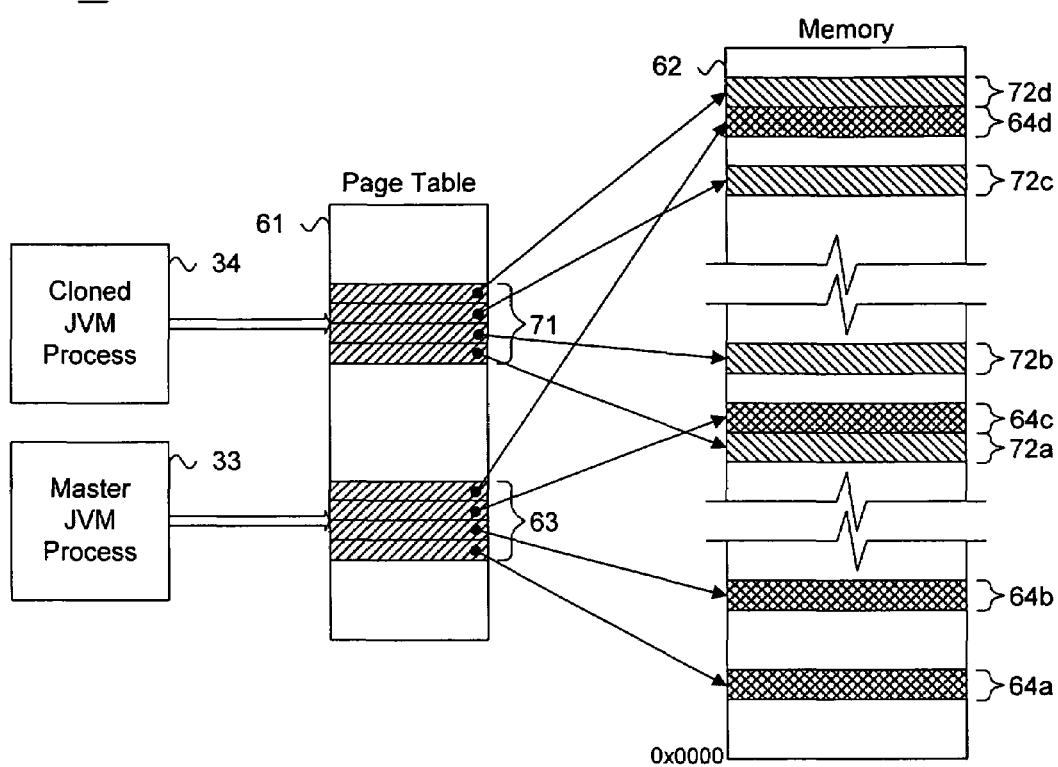
FIG. 4 is a block diagram showing, by way of example, a master JVM process and a cloned JVM process mapped into a page table through memory space cloning.

FIG. 4 is a block diagram 70 showing, by way of example, a master JVM process 33 and a cloned JVM process 34 mapped into memory 62 through memory space cloning. In a system with process cloning that does not provide copy-on-write semantics, physical copies of the pages 64a-c in the memory 62 storing the parent process context are created for each child process. In response to a process cloning request, the operating system instantiates a copy of the representation of the executable master JVM process 33 for the cloned JVM process 34 into the memory 62, possibly in non-contiguous pages 72a-d, and records the allocation of the memory space as page table entries 71 into the page table 61 prior to commencing execution of the cloned JVM process 34. Thus, the cloned JVM process 34 is created with a physical copy of the context of the master JVM process 33. Since a new, separate physical copy of the master JVM process context is created, the cloned JVM process 34 inherits the prewarmed state 41, including the preloaded classes of the master JVM process 33. However, the overall memory footprint of the runtime environment 31 is increased by the memory space required to store the additional copy of the master JVM process context.

Cloned JVM Process Mapping with Copy-On-Write

Figure 5A:
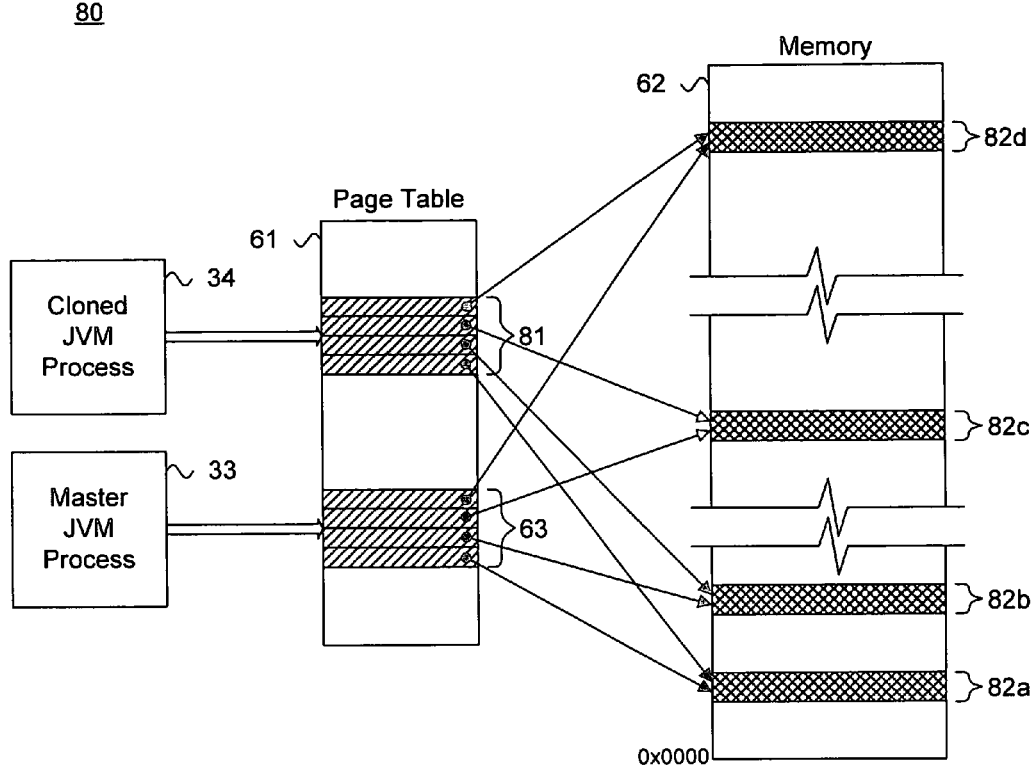
FIGS. 5A-B are block diagrams showing, by way of example, a master JVM process and a cloned JVM process mapped into a page table through memory space cloning with copy-on-write semantics.
Figure 5B:
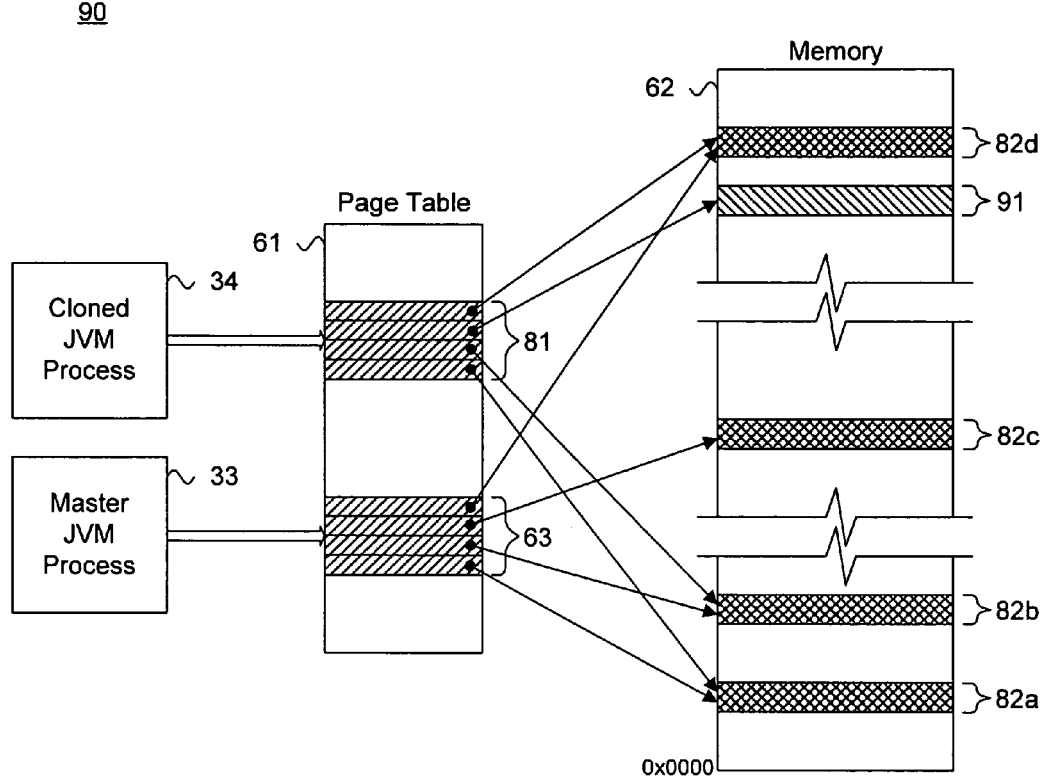

FIGS. 5A-B are block diagrams 80, 90 showing, by way of example, a master JVM process 33 and a cloned JVM process 34 mapped into memory 62 through memory space cloning with copy-on-write semantics. In a system with process cloning that provides copy-on-write semantics, only copies of the references, typically page table entries, to the memory space storing the parent process context are created for each child process. Referring first to FIG. 5A, in response to a process cloning request, the operating system copies only the page table entries 63 referencing the memory space of the executable master JVM process 33 as a new set of page table entries 81 for the cloned JVM process 34. Thus, the cloned JVM process 34 uses the same references to the possibly non-contiguous pages 64a-d storing the master JVM process context as the master JVM process 34. Initialization and execution of the application associated with the cloned JVM process 34 requires less time, as only the page table entries 62 are copied to clone the master JVM process context. Furthermore, until the cloned JVM process 34 attempts to modify the master JVM process context, the memory space is treated as read only data, which can be shared by other processes.

Referring next to FIG. 5B, the cloned JVM process 34 has attempted to modify one of the pages 82c in the memory space of the master JVM process context. In response, the operating system creates a physical copy of the to-be-modified memory space page 82c as a new page 91 and updates the allocation in the page table entries 81 for the cloned JVM process 34. Through copy-on-write semantics, the overall footprint of the runtime environment 31 is maintained as small as possible and only grows until, and if, each cloned JVM process 34 actually requires additional memory space for application-specific context.

Method for Performing Incremental Initialization

Figure 6:
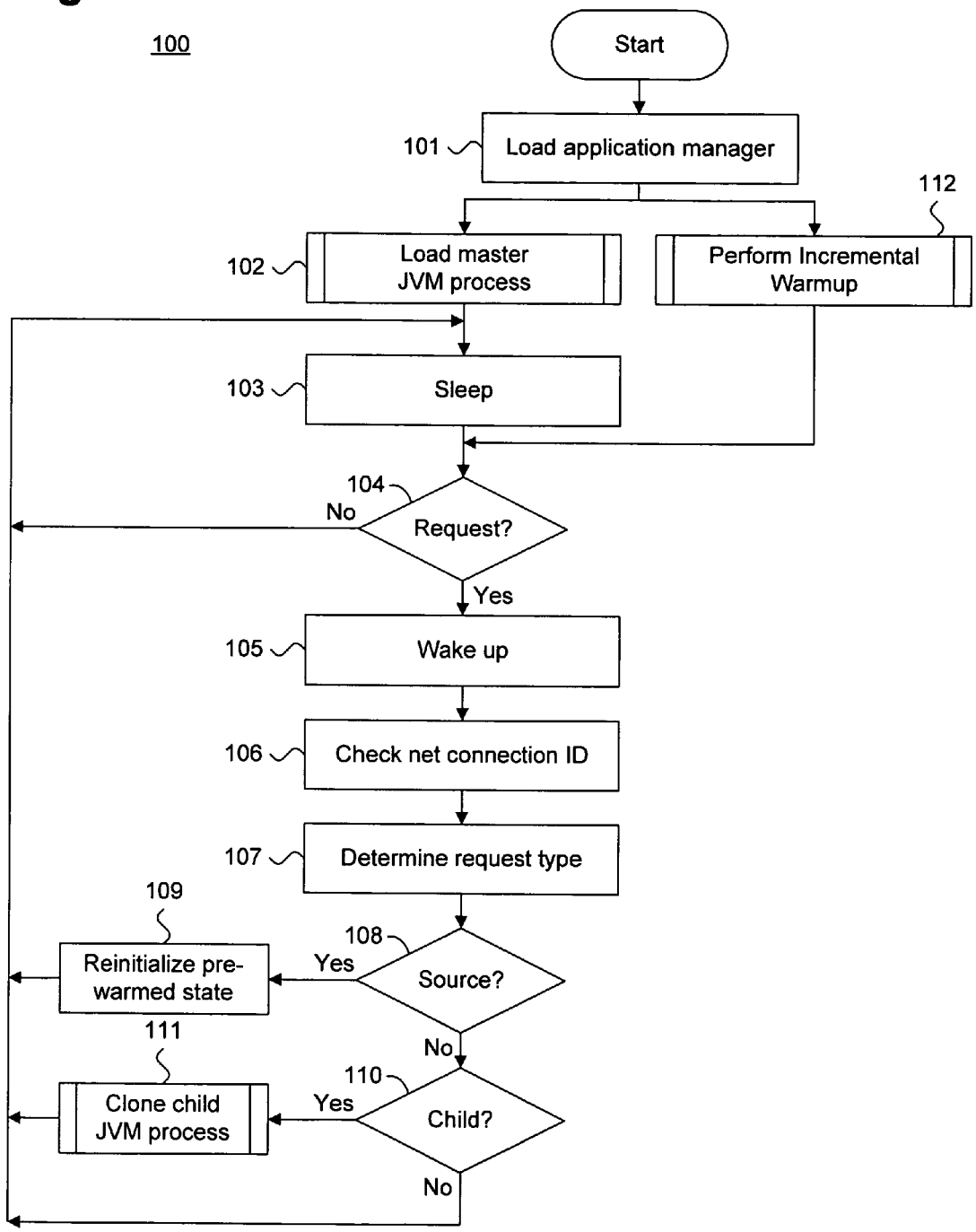
FIG. 6 is a flow diagram showing a method for performing incremental initialization of a master runtime system process, in accordance with the invention.

FIG. 6 is a flow diagram, showing a method 100 for performing incremental initialization of a master runtime system process, in accordance with the invention. The method 100 is described as a sequence of process operations or steps, which can be executed, for instance, by the runtime environment 31 of FIG. 2 or other components.

Initially, the application manager 32 is loaded (block 101) and processing for the master JVM process 33 (blocks 102-111) and application manager 32 (block 112) proceeds concurrently. The master JVM process 33 is loaded and initialized at device boot time (block 102), as further described below with reference to FIG. 7. Following loading and initialization, the master JVM process 33 enters an inactive sleep mode (block 103). Upon receiving a request from the application manager 32 (block 104), the master JVM process 33 awakens (block 105). If necessary, the master JVM process 33 checks the network connection identifier (ID) (block 106) for the application manager 32 and determines the type of request (block 107). The master JVM process 33 recognizes the commands list, jexec, source, and kill, as described above with reference to FIG. 2. If the request type corresponds to a source command, instructing the master JVM process 33 to execute a segment 46 of the warmup program 40 (block 108), the master JVM 33 executes the warmup program segment 46 (block 109), which refines or "enriches" the prewarmed state of the master JVM process 33, such that subsequently cloned JVM processes 34 spawned from the master JVM process 33 will inherit the refined context. If the request type corresponds to a jexec command, instructing the master JVM process 33 to initiate an execution of an application through process cloning (block 110), a cloned JVM process 34 is cloned and executed (block 111), as further described below with reference to FIGS. 8 and 9. Concurrently, the application manager 32 performs an incremental warmup of the master JVM process 33 (block 112), as further described below with reference to FIG. 10. Processing continues indefinitely until the master JVM process 33 and the runtime environment 31 are terminated.

Routine for Loading Master JVM Process

Figure 7:
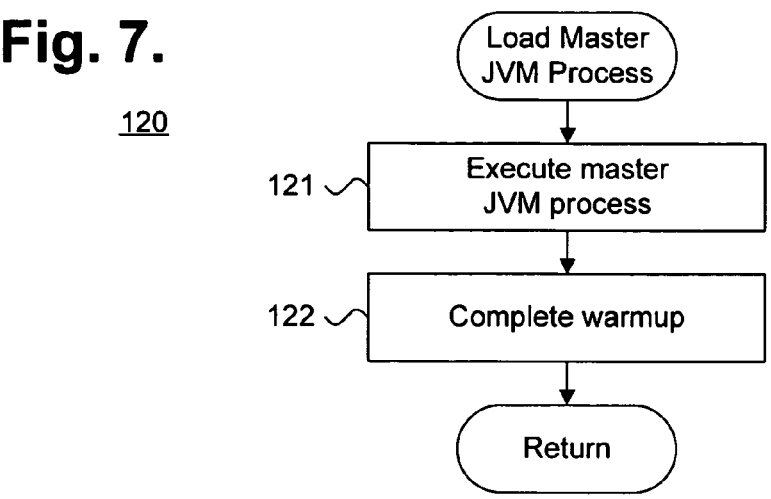
FIG. 7 is a flow diagram showing the routine for loading a master JVM process for use in the method of FIG. 6.

FIG. 7 is a flow diagram showing the routine 120 for loading a master JVM process 33 for use in the method 100 of FIG. 6. One purpose of the routine is to invoke the master JVM process 33.

Initially, the master JVM process 33 begins execution at device boot time (block 121). The master JVM process 33 then completes any other warmup operations (block 122) and the routine returns.

Routine for Process Cloning without Copy-On-Write

Figure 8:
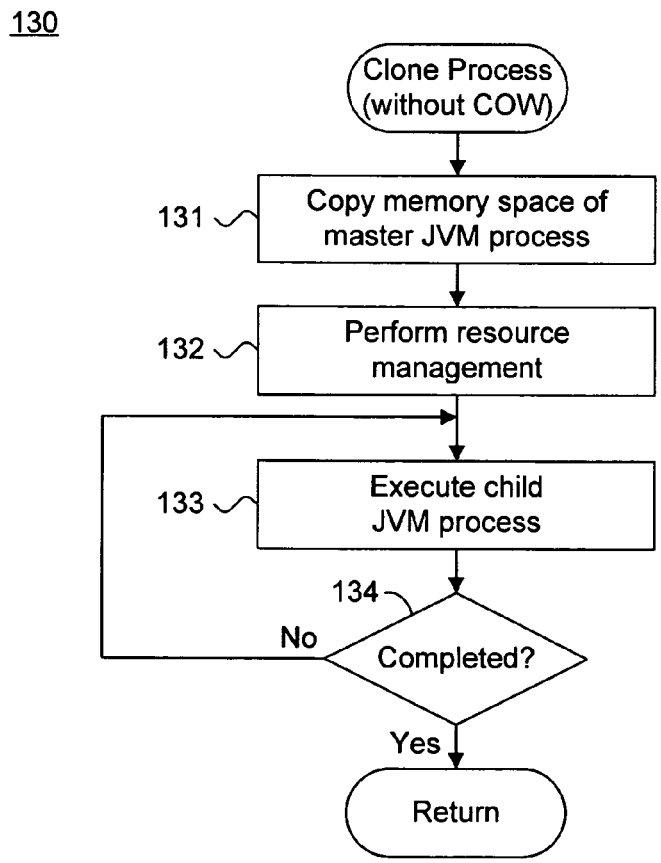
FIG. 8 is a flow diagram showing the routine for cloning a process without copy-on-write semantics for use in the method of FIG. 6.

FIG. 8 is a flow diagram showing the routine 130 for cloning a process without copy-on-write for use in the method 100 of FIG. 6. One purpose of the routine is to create and initiate execution of a cloned JVM process 34 through process cloning that does not provide copy-on-write semantics.

Initially, the memory space containing the context of the master JVM process 33 is physically copied into a new memory space for the cloned JVM process 34 (block 131). Optionally, the master JVM process 33 can set operating system level resource management parameters over the cloned JVM process 34 (block 132), including setting scheduling priorities and limiting processor and memory consumption. Other types of resource management controls are possible. The cloned JVM process 34 is then executed by the runtime environment 31 (block 133) using the duplicated master JVM process context. The routine returns upon the completion (block 134) of the cloned JVM process 34.

Routine for Process Cloning with Copy-On-Write

Figure 9:
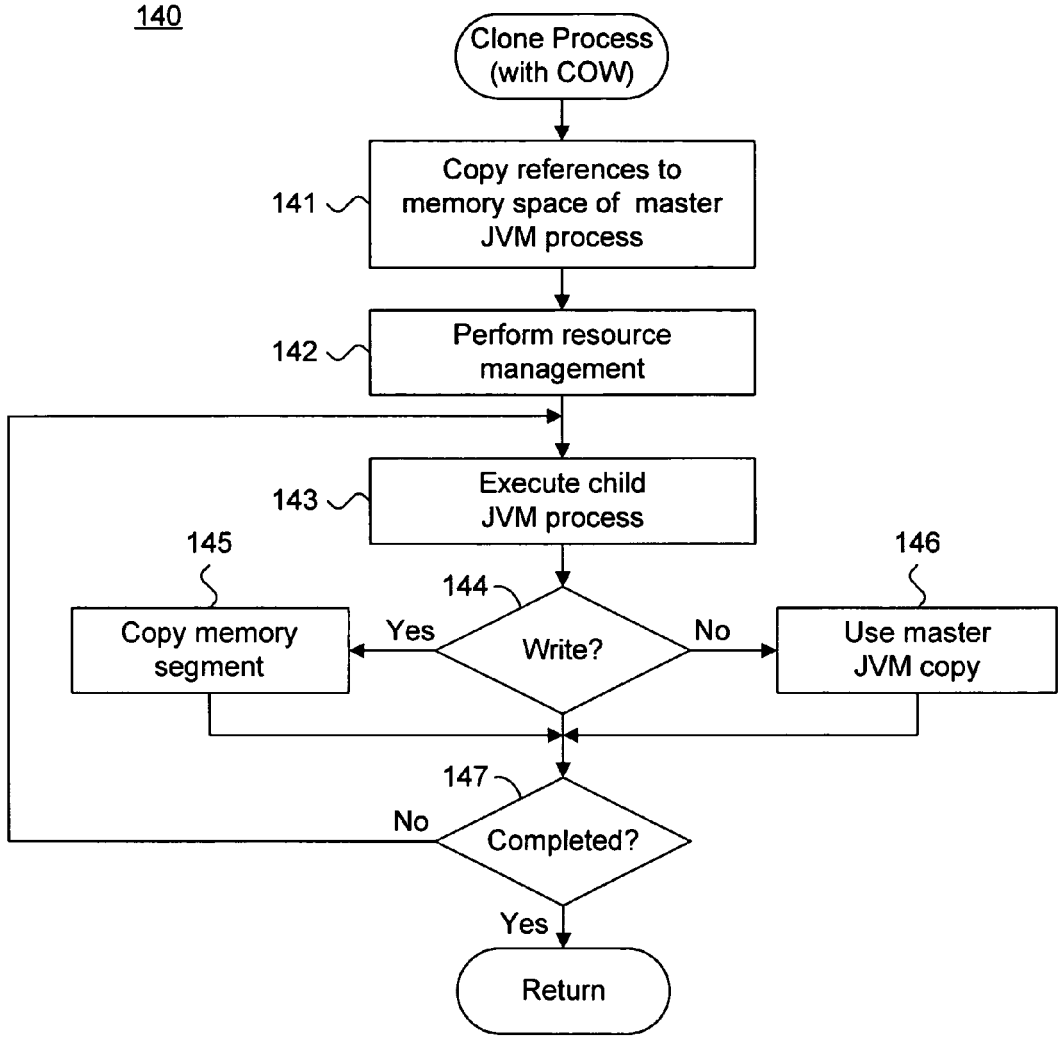
FIG. 9 is a flow diagram showing the routine for cloning a process with copy-on-write semantics for use in the method of FIG. 6.

FIG. 9 is a flow diagram showing the routine 140 for cloning a process with copy-on-write for use in the method 100 of FIG. 6. One purpose of the routine is to create and initiate execution of a cloned JVM process 34 through process cloning that provides copy-on-write semantics.

Initially, references to the memory space containing the context of the master JVM process 33 are copied for the cloned JVM process 34 (block 141). Optionally, the master JVM process 33 can set operating system level resource management parameters over the cloned JVM process 34 (block 142), including setting scheduling priorities and limiting processor and memory consumption. Other types of resource management controls are possible. The cloned JVM process 34 is then executed by the runtime environment 31 (block 143) using the referenced master JVM process context. Each time the cloned JVM process 34 attempts to write into the memory space referenced to the master JVM process context (block 144), the operating system copies the applicable memory segment (block 145).

Otherwise, the cloned JVM process 34 continues to use the referenced master JVM process context (block 146), which is treated as read only data. The routine returns upon the completion (block 147) of the cloned JVM process 34.

Routine for Performing an Incremental Warmup

Figure 10:
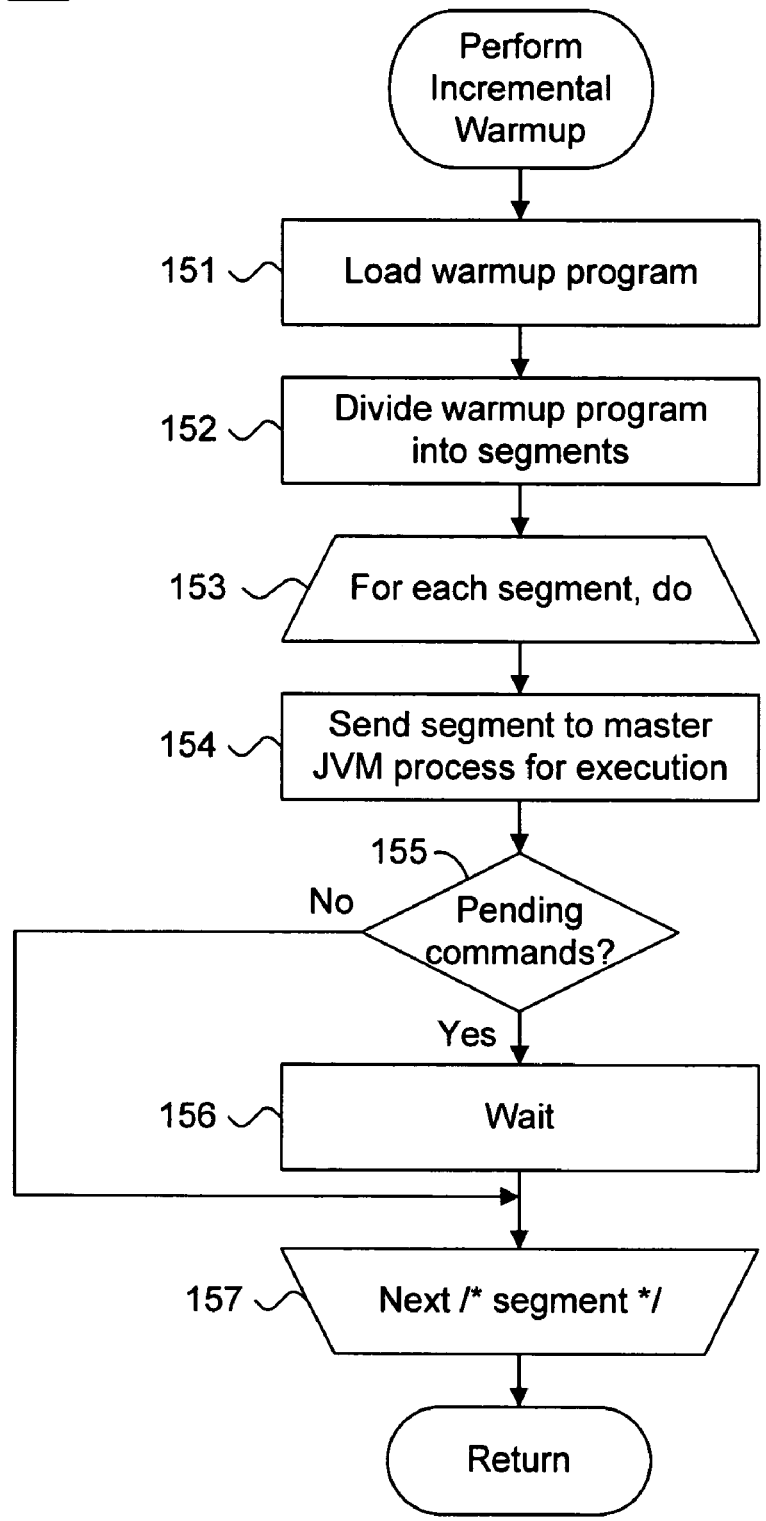
FIG. 10 is a flow diagram showing the routine for performing an incremental warmup for use in the routine of FIG. 7.

FIG. 10 is a flow diagram showing the routine 150 for performing an incremental warmup for use in the routine 100 of FIG. 7. One purpose of the routine is to incrementally initialize the master JVM process 33 to balance the startup time and processing overhead of the master JVM process 33 against the startup times and processing overheads of the cloned JVM processes 34.

Initially, the application manager 32 loads the warmup program 40 (block 151) and a warmup module 45 divides the warmup program 40 into segments 46 that can each be executed as a program invocation (block 152). The segment lengths and counts are tuned to trade off boot time against user interactivity. Each segment 46 is then iteratively processed (blocks 153-157) as follows. During each iteration (block 153), the dispatch of warmup actions in each segment 46 (block 154) and user input processing by the application manager 32 (blocks 155-156) is interleaved. The application manager 32 sends a segment 46 to the master JVM process 33 one after the other in sequence without waiting using the source command (block 154). In response, the master JVM process 33 executes each segment 46 to incrementally warmup the context. Each subsequently spawned cloned JVM process 33 inherits the then-warmed up context as inherited prewarmed state 43 and inherited system class dictionary 44 based on the segments 46 executed by the master JVM process 33 up to that time. If any commands are pending, such as a jexec command (block 155), the application manager 32 waits for command completion (block 156). In a further embodiment, the application manager 32 skips waiting and relies on the IPC mechanism provided by the underlying operating system to enqueue the source command. Processing continues with each remaining segment 46 (block 157), after which warmup is complete and the routine returns.

While the invention has been particularly shown and described as referenced to the embodiments thereof, those skilled in the art will understand that the foregoing and other changes in form and detail may be made therein without departing from the spirit and scope of the invention.

What is claimed is:

1. A system for performing incremental initialization of a master runtime system process, comprising:
a set of one or more warmup actions from a source definition provided as object-oriented program code;
a master runtime system process;
an incremental initializer to execute each warmup action to refine a memory space of the master runtime system process;
a storage device which stores the memory space of the master runtime system process;
a runtime environment to clone the memory space, and upon receiving a request to execute an application through process cloning;
a mechanism configured to pause execution of the warmup actions;
the runtime environment configured to clone the memory space as a child runtime system, wherein the cloned memory space includes results from the warmup actions that have completed;
a mechanism configured to execute the child runtime process;
a mechanism configured to resume execution of the warmup actions; and
a copy-on-write process cloning mechanism to instantiate the child runtime system process by copying references to the memory space of the master runtime system process into a separate memory space for the child runtime system process, and to defer copying of the memory space of the master runtime system until the child runtime system process needs to modify the referenced memory space of the master runtime system process.

2. A system according to claim 1, further comprising:
an application manager to provide each warmup action to the master runtime system process in sequence without wait.

3. A system according to claim 2, wherein the application manager awaits completion of a pending action by the master runtime process prior to providing an initial warmup action.

4. A system according to claim 2, further comprising:
an inter-process communication mechanism sending each warmup action without awaiting completion of a pending action by the master runtime process prior to providing an initial warmup action.

5. A system according to claim 1, further comprising:
a program to specify each warmup action with a list of arguments to the source definition.

6. A system according to claim 1, further comprising:
one or more programs to specify each warmup action as separate source definitions.

7. A system according to claim 1, further comprising:
an application manager to complete each such warmup action prior to cloning of the memory space.

8. A system according to claim 1, further comprising:
a plurality of the warmup actions; and
a warmup module to segment each such warmup action.

9. A system according to claim 1, wherein the warmup actions are selected from the set comprising dynamically preloading classes, performing streamlined static initialization, performing speculative initialization of application models, providing precompiled code, learning with dynamic feedback, and inducing behavior changes.

10. A system according to claim 1, further comprising:
a process cloning mechanism to instantiate the child runtime system process by copying the memory space of the master runtime system process into a separate memory space for the child runtime system process.

11. A system according to claim 1, wherein the master runtime system process is caused to sleep relative to receiving the process request.

12. A system according to claim 1, further comprising:
a resource controller to set operating system level resource management parameters on the child runtime system process.

13. A system according to claim 1, wherein the object-oriented program code is written in the Java programming language.

14. A system according to claim 13, wherein the master runtime system process and the child runtime system process are Java virtual machines.

15. A method for performing incremental initialization of a master runtime system process, comprising:
defining a set of one or more warmup actions from a source definition provided as object-oriented program code;

executing a master runtime system process;
an incremental initializer to execute each warmup action to refine a memory space of the master runtime system process; and
a storage device which stores the memory space of the master runtime system process;
a runtime environment to clone the memory space;
upon receiving a request to execute an application through process cloning,
    pausing execution of the warmup actions,
    the runtime environment configured to clone the memory space as a child runtime system, wherein the cloned memory space includes results from the warmup actions that have completed,
    a mechanism configured to execute the child runtime process, and
    a mechanism configured to execution of the warmup actions; and
a copy-on-write process cloning mechanism to instantiate the child runtime system process by copying references to the memory space of the master runtime system process into a separate memory space for the child runtime system process, and to defer copying of the memory space of the master runtime system until the child runtime system process needs to modify the referenced memory space of the master runtime system process.

16. A method according to claim 15, further comprising:
providing each warmup action to the master runtime system process in sequence without wait.

17. A method according to claim 16, further comprising:
awaiting completion of a pending action by the master runtime process prior to providing an initial warmup action.

18. A method according to claim 16, further comprising:
sending each warmup action using an inter-process communication mechanism without awaiting completion of a pending action by the master runtime process prior to providing an initial warmup action.

19. A method according to claim 15, further comprising:
specifying each warmup action with a list of arguments to the source definition.

20. A method according to claim 15, further comprising:
specifying each warmup action as separate source definitions.

21. A method according to claim 15, further comprising:
completing each such warmup action prior to cloning of the memory space.

22. A method according to claim 15, further comprising:
specifying a plurality of the warmup actions; and
segmenting each such warmup action.

23. A method according to claim 15, wherein the warmup actions are selected from the set comprising dynamically preloading classes, performing streamlined static initialization, performing speculative initialization of application models, providing precompiled code, learning with dynamic feedback, and inducing behavior changes.

24. A method according to claim 15, further comprising:
instantiating the child runtime system process by copying the memory space of the master runtime system process into a separate memory space for the child runtime system process.

25. A method according to claim 15, further comprising:
causing the master runtime system process to sleep relative to receiving the process request.

26. A method according to claim 15, further comprising:
setting operating system level resource management parameters on the child runtime system process.

27. A method according to claim 15, wherein the object-oriented program code is written in the Java programming language.

28. A method according to claim 27, wherein the master runtime system process and the child runtime system process are Java virtual machines.

29. An apparatus for performing incremental initialization of a master runtime system process, comprising:
means for defining a set of one or more warmup actions from a source definition provided as object-oriented program code;
means for executing a master runtime system process;
means for executing each warmup action to refine a memory space of the master runtime system process;
a storage mechanism configured to store the memory space of the master runtime system process;
means for cloning the memory space upon receiving a request to execute an application through process cloning;
means for pausing execution of the warmup actions;
means for cloning the memory space as a child runtime system wherein the cloned memory space includes results from the warmup actions that have completed;
means for executing the child runtime process;
means for resuming execution of the warmup actions; and
a copy-on-write process cloning mechanism to instantiate the child runtime system process by copying references to the memory space of the master runtime system process into a separate memory space for the child runtime system process, and to defer copying of the memory space of the master runtime system until the child runtime system process needs to modify the referenced memory space of the master runtime system process.

* * * * *